United States Patent
Litwin et al.

(10) Patent No.: US 7,463,618 B2
(45) Date of Patent: Dec. 9, 2008

(54) FRAME SYNCHRONIZATION IN A UNIVERSAL MOBILE TELEPHONE SYSTEM RECEIVER

(75) Inventors: Louis Robert Litwin, Plainsboro, NJ (US); Wen Gao, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 399 days.

(21) Appl. No.: 10/566,492

(22) PCT Filed: Aug. 4, 2003

(86) PCT No.: PCT/US03/24351

§ 371 (c)(1),
(2), (4) Date: Jan. 30, 2006

(87) PCT Pub. No.: WO2005/018111

PCT Pub. Date: Feb. 24, 2005

(65) Prior Publication Data

US 2006/0193305 A1    Aug. 31, 2006

(51) Int. Cl.
*H04J 3/06* (2006.01)
*H04B 7/212* (2006.01)
*H04L 7/00* (2006.01)

(52) U.S. Cl. .......... 370/350; 370/345; 370/347; 370/509; 370/510; 375/356; 375/365

(58) Field of Classification Search .......... 370/280–282, 370/294, 321, 324, 326, 336–338, 376, 395.62, 370/431, 437, 442, 498, 537–544, 310, 328–333, 370/341–350, 507–515, 520; 375/145–149, 375/240.28, 347–366, 368, 370, 142, 369, 375/375; 455/103, 151.1, 154.1, 158.1, 185.1, 455/186.1, 434, 450, 455, 464, 509, 511, 455/514–517, 550.1, 556.2, 561, 13.2, 69, 455/502; 386/12, 48, 61, 71, 84; 398/154–155; 714/775–776, 789, 798–799

See application file for complete search history.

(56) References Cited

U.S. PATENT DOCUMENTS

| | | | | |
|---|---|---|---|---|
| 6,526,091 | B1 * | 2/2003 | Nystrom et al. | 375/142 |
| 6,894,996 | B2 * | 5/2005 | Lee | 370/337 |
| 6,990,091 | B2 * | 1/2006 | Sarkar | 370/342 |
| 7,061,966 | B2 * | 6/2006 | Storm et al. | 375/145 |
| 7,292,551 | B2 * | 11/2007 | Lim et al. | 370/332 |
| 7,324,479 | B2 * | 1/2008 | Hur | 370/332 |
| 2003/0156574 | A1 | 8/2003 | Raaf | |
| 2003/0220755 | A1 * | 11/2003 | Darbel et al. | 702/89 |

OTHER PUBLICATIONS

Search Report dated Nov. 2, 2004.

* cited by examiner

*Primary Examiner*—Meless N Zewdu
(74) *Attorney, Agent, or Firm*—Joseph J. Laks; Robert D. Shedd; Joseph J. Opalach (57) ABSTRACT

A Universal Mobile Telephone System (UMTS) receiver performs slot synchronization using a received primary synchronization channel (PSCH). Subsequent to completion of slot synchronization, the UMTS receiver performs frame synchronization using a received secondary synchronization channel (SSCH) in such a way that the UMTS receiver uses the received primary synchronization channel (PSCH) to detect a change in channel conditions.

9 Claims, 6 Drawing Sheets

FRAME SYNCHRONIZATION IN A UNIVERSAL MOBILE TELEPHONE SYSTEM RECEIVER

BACKGROUND OF THE INVENTION

This application claims the benefit, under 35 U.S.C. § 365 of International Application PCT/US03/024351, filed Aug. 4, 2003, which was published in accordance with PCT Article 21(2) on Feb. 24, 2005 in English.

The present invention generally relates to wireless receiving devices, and more particularly, to user equipment (UE) in a spread-spectrum based wireless system such as the Universal Mobile Telephone System (UMTS).

The basic unit of time in UMTS radio signals is a 10 milli-second (ms) radio frame, which is divided into 15 slots of 2560 chips each. UMTS radio signals from a cell (or base station) to a UMTS receiver are "downlink signals," while radio signals in the reverse direction are termed "uplink signals." When a UMTS receiver is first turned on, the UMTS receiver performs a "cell search" to search for a cell to communicate with. In particular, and as described below, the UMTS receiver initially looks for a downlink synchronization channel (SCH) transmitted from the cell to synchronize thereto at the slot and frame levels, and to determine the particular scrambling code group of the cell. Only after a successful cell search can voice/data communications begin.

With respect to the cell search, the SCH is a sparse downlink channel that is only active during the first 256 chips of each slot. The SCH is made up of two subchannels, the Primary SCH (PSCH) and the Secondary SCH (SSCH). The PSCH 256 chip sequence, or PSCH code, is the same in all slots of the SCH for all cells. In contrast, the SSCH 256 chip sequence, or SSCH code, may be different in each of the 15 slots of a radio frame and is used to identify one of 64 possible scrambling code groups. In other words, each radio frame of the SCH repeats a scrambling code group sequence associated with the respective transmitting cell. Each SSCH code is taken from an alphabet of 16 possible SSCH codes.

As part of the cell search, the UMTS receiver first uses the PSCH to achieve slot synchronization. In this regard, the UMTS receiver correlates received samples of the received PSCH against the known PSCH 256 chip sequence (which is the same for all slots) and, based on the location of the correlation peak, determines a slot reference time. Once the slot reference time is determined, the UMTS receiver is slot synchronized and can determine when each slot starts in a received radio frame.

After slot synchronization, the UMTS receiver ceases processing of the PSCH and begins processing the SSCH. In particular, the UMTS receiver correlates the particular sequence of 15 SSCH codes in a received radio frame against known sequences to achieve frame synchronization and to determine the scrambling code group of the cell. Identification of the scrambling code group then enables the UMTS receiver to descramble all of the other downlink channels of the cell (e.g., the Common Pilot Channel (CPICH)) for voice/data communications to begin.

Unfortunately, the above-described cell search process has some drawbacks. One is time. Since SSCH processing involves the identification of a sequence of 15 particular SSCH codes, the SSCH code processing typically occurs over a number of received radio frames, e.g., 10 to 20. Therefore, completion of the cell search may take on the order of 100 to 200 ms. Another drawback is that the UMTS receiver does not achieve frequency synchronization until the CPICH is descrambled, which, as noted above, occurs after successful completion of the above-mentioned cell search. As such, and especially since the UMTS receiver may be mobile, it is possible that channel conditions may change during SSCH processing such that the UMTS receiver loses slot synchronization (e.g., the correlation peak moves or disappears). If this happens, the SSCH processing may fail. Further, this failure is not detected by the UMTS receiver until the SSCH processing finishes. Thus, the entire Cell Search process must start over—further lengthening the time a user must wait till voice/data communications can start.

SUMMARY OF THE INVENTION

Therefore, and in accordance with the principles of the invention, a wireless receiver performs slot synchronization using a received first synchronization channel, and, subsequent to completion of slot synchronization, performs frame synchronization using a received second synchronization channel in such a way that the received first synchronization channel is now used by the wireless receiver to detect a change in channel conditions.

In an embodiment of the invention, the wireless receiver is a part of the UMTS user equipment (UE), the first synchronization channel is the PSCH subchannel and the second synchronization channel is the SSCH subchannel. The wireless receiver continues to process the PSCH during SSCH processing to monitor channel conditions. In particular, if a correlation peak associated with the PSCH subchannel drops below a predefined threshold, then SSCH processing is halted. If the SSCH processing is halted within a predefined initial time period, then SSCH processing is started anew. However, if the SSCH processing is halted after the predefined initial time period, SSCH processing attempts to estimate the scrambling code group based on the currently accumulated data. In other words, the PSCH channel acts as an "early-warning" system to detect sudden channel changes early on, thus saving processing time and reducing the overall time that a user has to wait for voice/data communications to start after the UE is turned on.

In accordance with another embodiment of the invention, a cell search method uses PSCH processing as an early warning indicator of changing channel conditions, and notifies SSCH processing of changes in the channel conditions. Thus, the SSCH processing is prevented from continuing in situations where the channel conditions have changed significantly and which may result in erroneous results if SSCH processing were allowed to continue.

DETAILED DESCRIPTION

Other than the inventive concept, the elements shown in the figures are well known and will not be described in detail. Also, familiarity with UMTS-based wireless communications systems is assumed and is not described in detail herein. For example, other than the inventive concept, spread spectrum transmission and reception, cells (base stations), user equipment (UE), downlink channels, uplink channels and RAKE receivers are well known and not described herein. In addition, the inventive concept may be implemented using conventional programming techniques, which, as such, will not be described herein. Finally, like-numbers on the figures represent similar elements.

Figure 1:
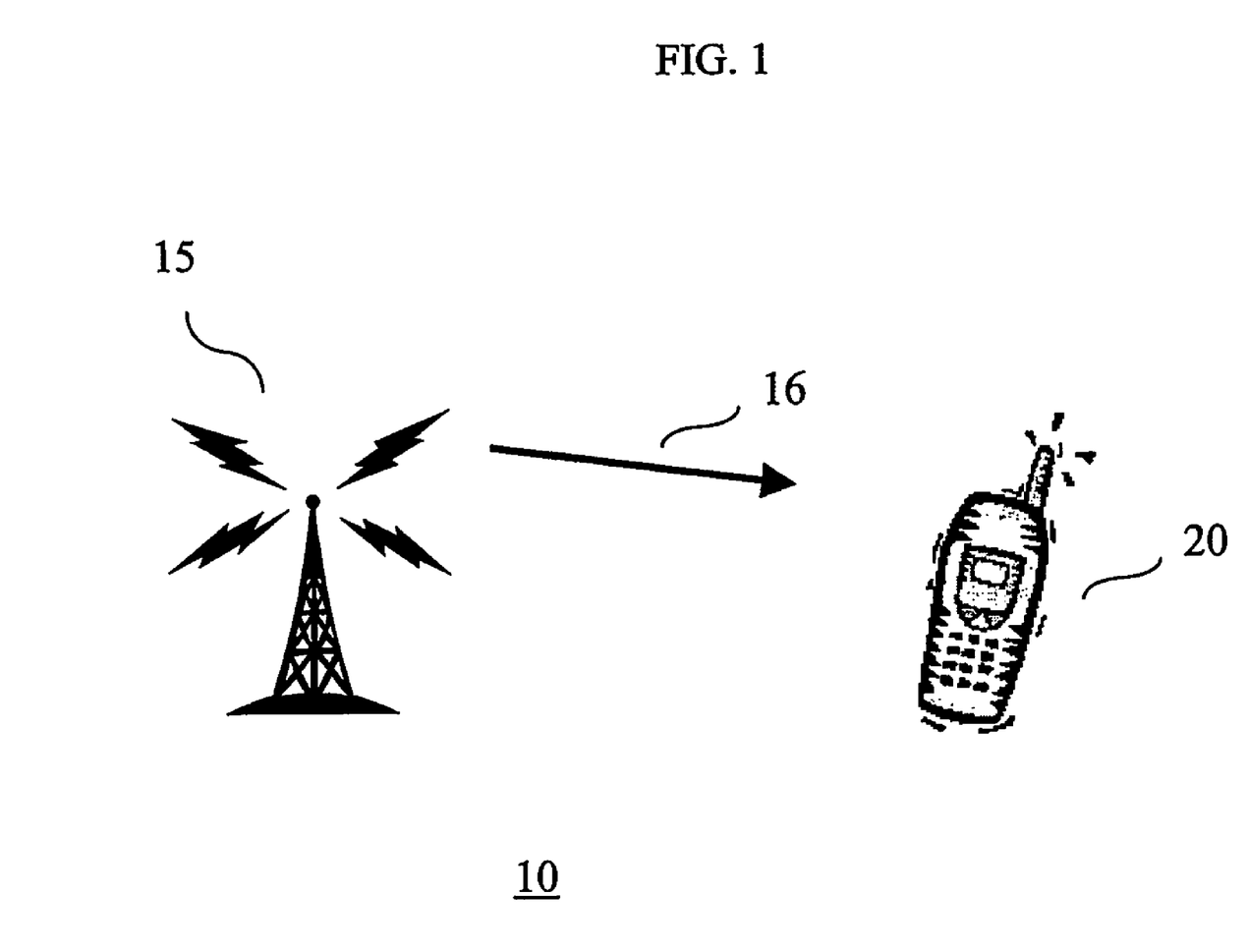
FIG. 1 shows a portion of an illustrative wireless communications system in accordance with the principles of the invention.

An illustrative portion of a UMTS wireless communications system 10 in accordance with the principles of the invention is shown in FIG. 1. Cell (or base station) 15 broadcasts a downlink synchronization channel (SCH) signal 16 including the above-mentioned PSCH and SSCH subchannels. As noted earlier, the SCH signal 16 is used by UMTS User Equipment (UE) for synchronization purposes as a precondition to voice/data communications. For example, the UE processes the SCH signal during a "cell search" operation. In this example, UE 20, e.g., a cellular phone, initiates a cell search when, e.g., UE 20 is turned on, or powered up. The purposes of the cell search operation include (a) synchronization to cell transmissions at the slot and frame level of the UMTS radio frame, and (b) determination of the scrambling code group of the cell (e.g., cell 15). As described below, and in accordance with the principles of the invention, UE 20 processes the SSCH subchannel to achieve frame synchronization with cell 15 while using the PSCH subchannel to monitor for changes in channel conditions. It should be noted that although the following examples illustrate the inventive concept in the context of this initial cell search, i.e., when UE 20 is turned on, the inventive concept is not so limited and is applicable to other instances of the cell search, e.g., when the UE is in an "idle mode."

Figure 2:
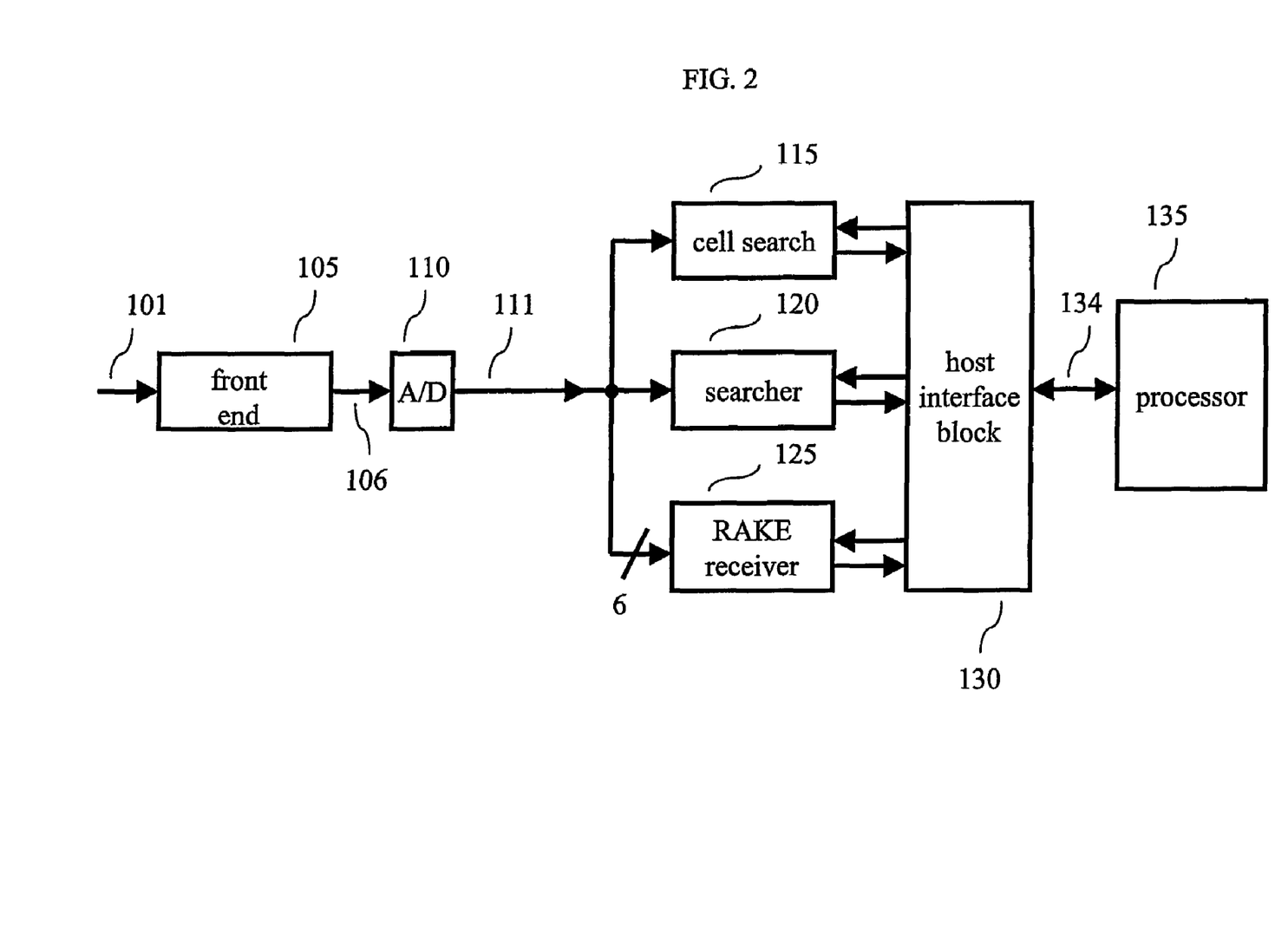
FIGS. 2 and 3 show illustrative embodiments of a wireless receiver in accordance with the principles of the invention.

Turning now to FIG. 2, an illustrative block diagram of a portion of UE 20 in accordance with the principles of the invention is shown. UE 20 includes front end 105, analog-to-digital (A/D) converter 110, cell search element 115, searcher element 120, rake receiver 125, host interface block 130 and processor 135. It should also be noted that, other than the inventive concept, additional elements may be included within the blocks shown in FIG. 2 as known in the art but are not described herein for simplicity. For example, A/D converter 110 may include digital filters, buffers, etc.

Front end 105 receives a radio-frequency (RF) signal 101 transmitted from cell 15 (FIG. 1) via an antenna (not shown) and provides a base band analog signal 106 representing the PSCH and SSCH subchannels. Base band analog signal 106 is sampled by A/D converter 110, which provides a stream of received samples 111. The received samples 111 are available to three components: cell search element 115, searcher element 120 and rake receiver 125. Cell search element 115 processes the PSCH and SSCH subchannels in accordance with the principles of the invention as described further below. Subsequent to a successful cell search, searcher element 120 evaluates the received samples for the assignment of multipaths to each of the fingers of rake receiver 125, which, e.g., is capable of combining data from multiple paths in providing symbols for subsequent decoding by a decoder (not shown) to provide voice/data communications. Since only cell search element 115 is relevant to the inventive concept, search component 120 and rake receiver 125 are not described further herein. Host interface block 130 couples data between the three aforementioned components and processor 135, which, in this context, receives the results from cell search component 115 via signaling 134. Processor 135 is illustratively a stored-program controller processor, e.g., a microprocessor and includes memory (not shown) for storing programs and data.

Figure 3:
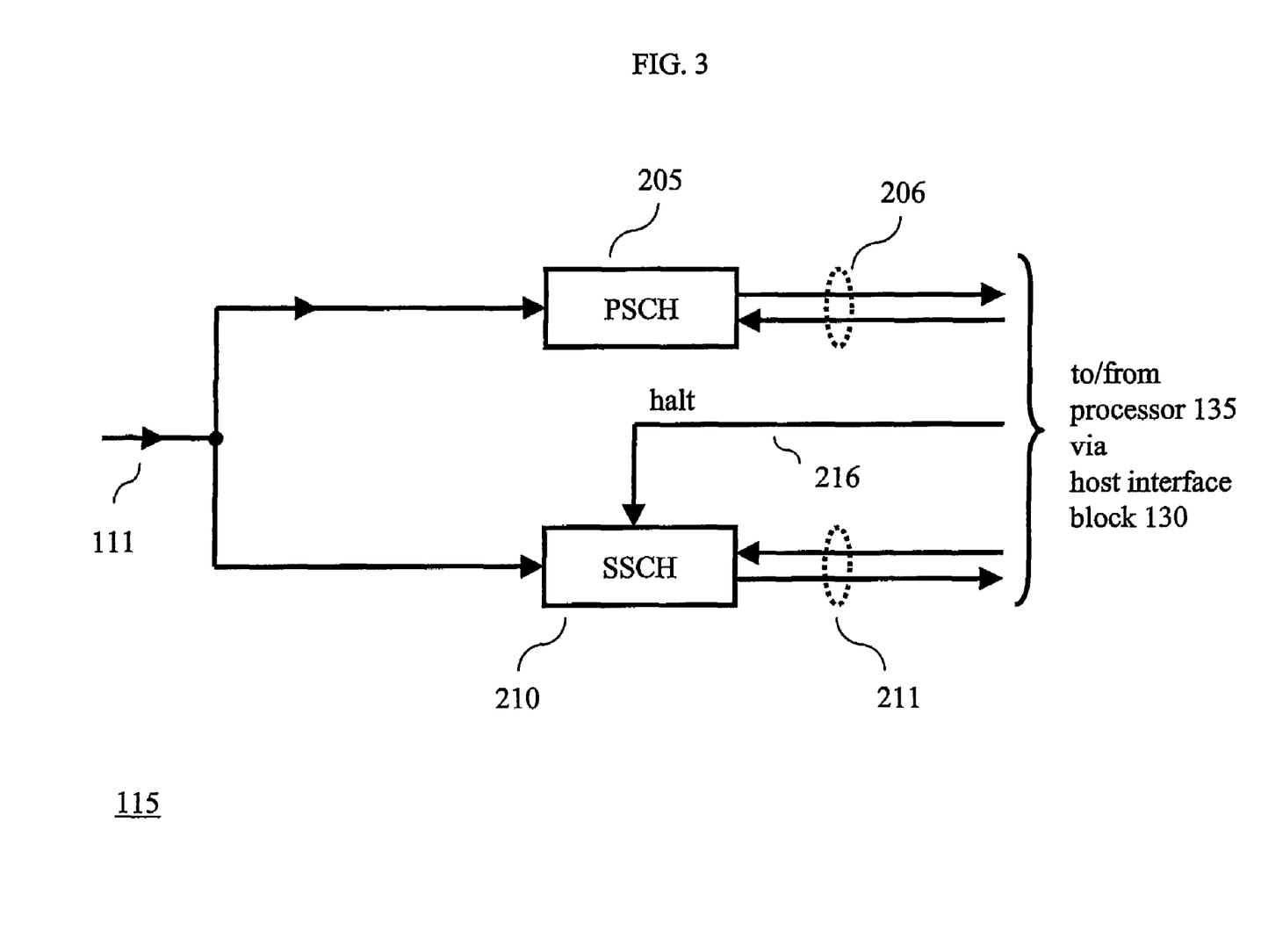

Turning now to FIG. 3, an illustrative block diagram of cell search element 115 is shown. Cell search element 115 includes PSCH element 205 and SSCH element 210. Reference should now also be made to FIG. 4, which shows an illustrative flow chart in accordance with the principles of the invention for processing the downlink PSCH and SSCH subchannels with cell search element 115 of FIG. 3. Processor 135 of UE 20 initiates the cell search in step 305 attempting to achieve slot synchronization by processing the downlink PSCH subchannel in step 305. In particular, processor 135 activates PSCH element 205, via signaling 206, to process the received samples 111 as known in the art. For example, since the downlink PSCH subchannel is a known PSCH 256 chip sequence, or PSCH code, that occurs periodically (i.e., repeats in every slot of the downlink SCH signal), PSCH element 205 correlates the received samples 111 against the PSCH code and provides an associated peak correlation value. In this regard, PSCH element 205 comprises a matched filter and a buffer (both not shown) that stores the output signal of the matched filter. PSCH element 205 provides a peak value to processor 135 via signaling 206. This peak value may be averaged over several slots of a received radio frame(s), e.g., between four and twenty slots, to decrease the probability of a "false lock." If the peak value is not greater than a predefined threshold, processor 135 controls PSCH element 305 to continue processing any received signals to continue to look for a cell. However, if the peak value is greater than a predefined threshold, UE 20 completes slot synchronization and processor 135 continues the cell search process with respect to frame synchronization and determining the particular scrambling code group for the associated cell. An alternative method is to deem slot synchronization complete when the peak correlation value exceeds the next highest correlation value by a predefined additive or multiplicative factor.

Figure 4:
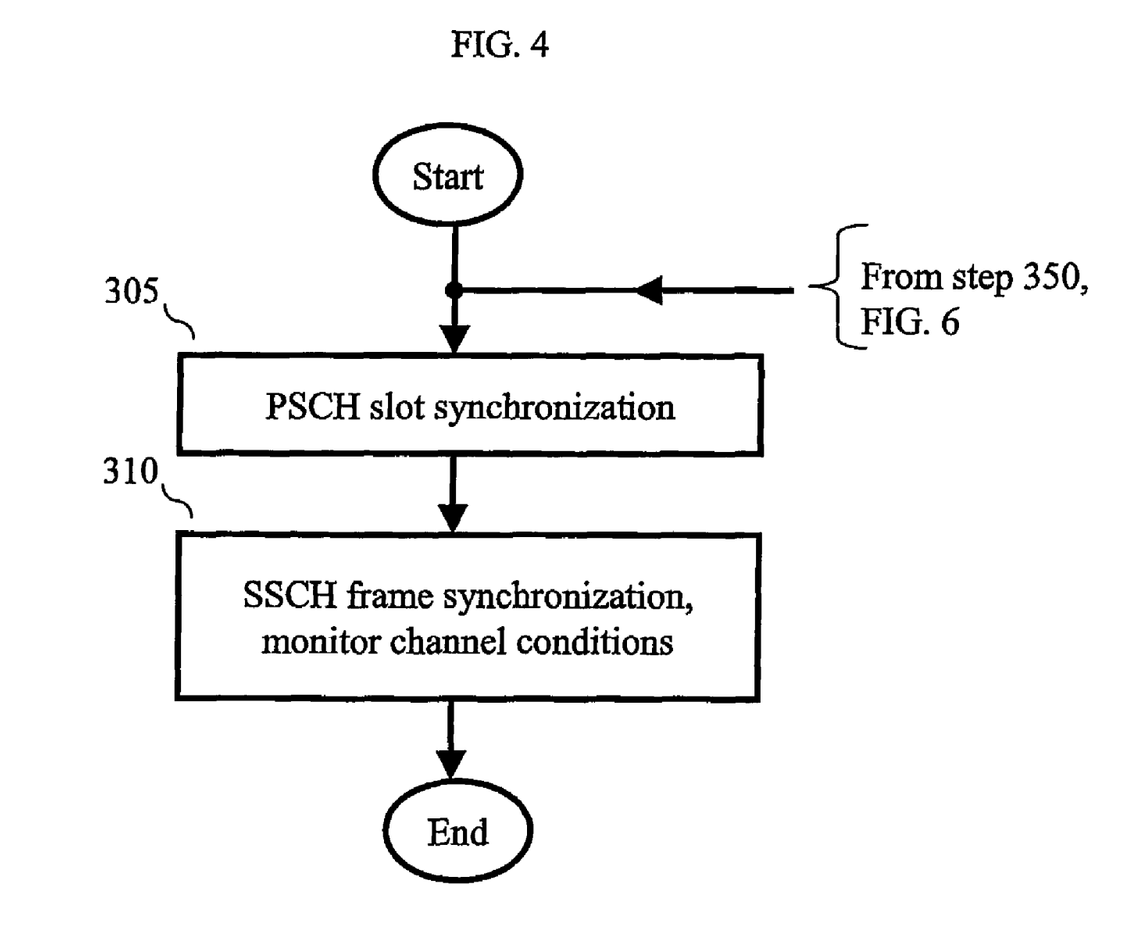
FIGS. 4, 5 and 6 show illustrative flow charts in accordance with the principles of the invention.

In particular, in step 310 of FIG. 4, and in accordance with the principles of the invention, processor 135 enables both SSCH element 210 and PSCH element 205. The former element processes the received samples 111 as known in the art for use in attempting frame synchronization and for identification of the scrambling code group of cell 15. The latter element processes the PSCH subchannel to serve as an early warning detector for monitoring, or detecting changes in, channel conditions during SSCH processing.

Figure 5:
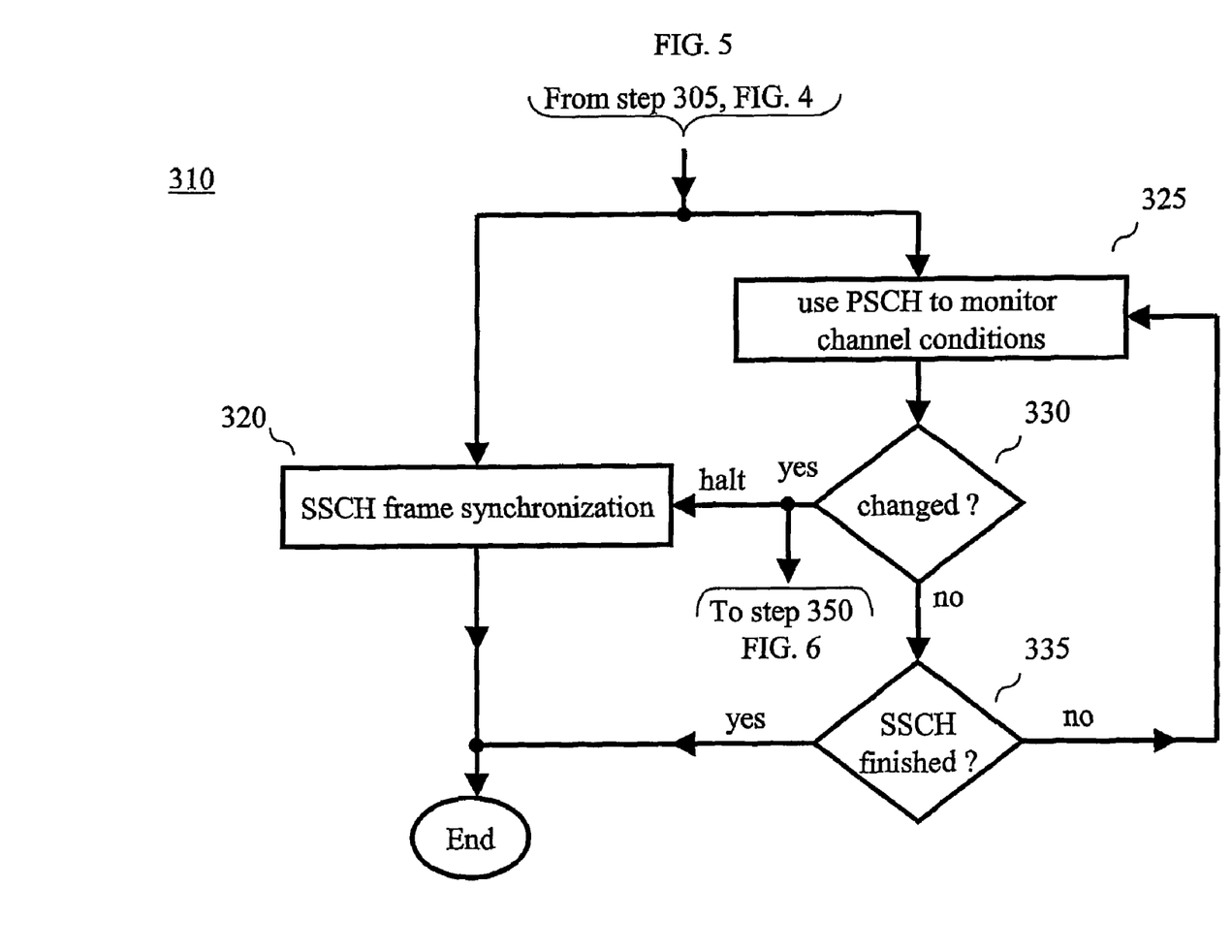

Turning now to FIG. 5, step 310 of FIG. 4 is shown in more detail. Illustratively, step 310 includes step 320, which is related to SSCH processing, and steps 325, 330 and 335, which relate to monitoring channel conditions. Step 320 corresponds to SSCH processing as known in the art and is illustratively performed by SSCH element 210 and processor 135 of FIGS. 2 and 3, respectively. SSCH element 210 is coupled with processor 135 via signaling 211. As noted above, the SSCH 256 chip sequence, or SSCH code, is different in each of the 15 slots of a radio frame for a particular cell. As such, each radio frame repeats a unique 15 SSCH code associated with a particular cell. Once activated by processor 135, SSCH element 210 correlates the particular sequence of 15 SSCH codes in a received radio frame against known sequences for use in achieving frame synchronization and for use in determining the scrambling code group of the cell (here, the scrambling code group associated with cell 15). As noted above, the SSCH processing may require processing a number of received radio frames, e.g., 10 to 20, because UE 20 averages correlations over successive frames of data in order to get a robust estimate of the received 15 SSCH code sequence. Consequently, the time duration for SSCH processing may be on the order of 100 to 200 ms. Unfortunately, during this time frame UE 20 may lose slot synchronization. Therefore, and in accordance with an aspect of the invention, processor 135 uses PSCH element 205 during SSCH processing as an early warning detector of changes in channel conditions. In this regard, at activation of SSCH processing, processor 135 also enables a timer (not shown) to track the processing time (described below) for step 320. As known in the art, a timer can be implemented in software and/or hardware.

In particular, in step 325, PSCH element 205 correlates the received samples 111 against the known PSCH code during each slot and provides the magnitude of a corresponding correlation peak to processor 135 via signaling 206. In step 330, processor 135 compares the received correlation peak to a predetermined threshold. It should be noted that it doesn't matter if a stronger peak is out there (e.g., from a different cell), what is important is that the original peak (i.e., the one that the SSCH processing is currently tuned to, i.e., the signal from cell 15) is still there (even if it is now weaker). In this regard, if the magnitude of the received correlation peak is greater than the predetermined threshold (e.g., 50% of the original peak value), then it is assumed that channel conditions have not changed and processor 135 executes step 335. The latter determines if SSCH processing is finished. If SSCH processing is finished, then cell search ends. However, if SSCH processing is not finished, then processor 135 returns to step 325 to continue use of the PSCH subchannel as an early warning detector of a change in channel conditions.

However, if, in step 330, the received correlation peak is less than, or equal to, the predetermined threshold, it is presumed that channel conditions have changed such that continued SSCH processing will now be degraded. As such, processor 135 then halts the SSCH processing of step 320, as illustratively represented by halt signal 216 of FIG. 2. Processor 135 then proceeds to illustrative steps 350, 355 and 360 of FIG. 6. In step 350, processor 135 evaluates the value of the above-mentioned timer, which measures the currently elapsed time for SSCH processing. If the elapsed time is less than, or equal to a predefined value, i.e., it is "early" in the SSCH processing, processor 135 restarts cell search in step 305 of FIG. 4. In this case, it is presumed that SSCH processing does not yet have enough data to form a reliable decision as to frame synchronization and the scrambling code group of cell 15 and that it is better to restart the cell search. The definition of "early" is, e.g., that SSCH processing is less than 50% complete, or even less than 75% complete. For example, if SSCH processing is predefined as processing at least 10 radio frames, each frame being 10 ms, then an illustrative time value for use in step 350 may be 75 ms.

Figure 6:
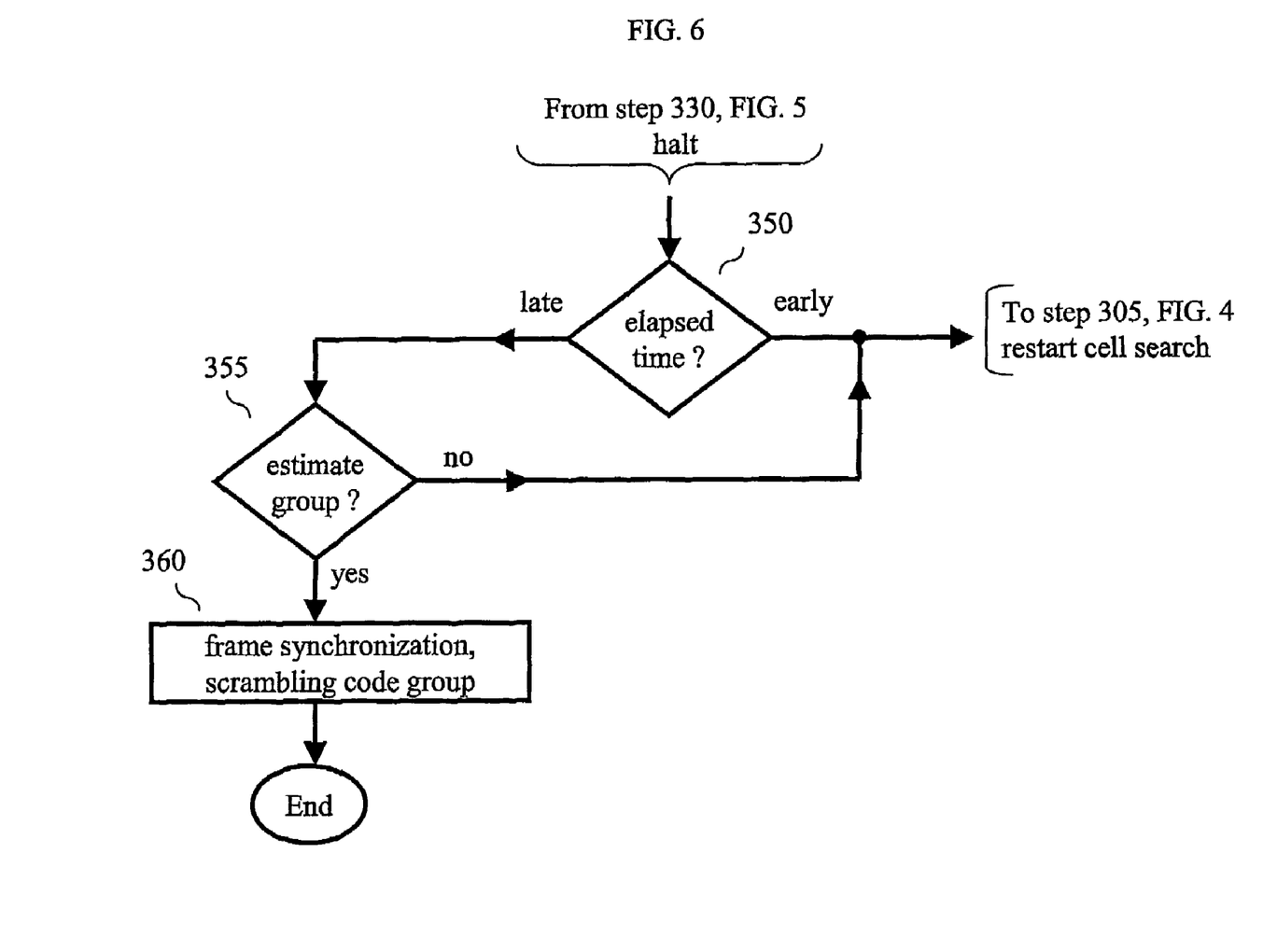

On the other hand, if the elapsed time is greater than the predefined value, i.e., it is "late" in the SSCH processing, then it is presumed that continued SSCH processing will contaminate the currently accumulated data with data that may not be reliable. As such, processor 135 checks, in step 355, if a scrambling code group for cell 15 can be estimated based on the currently accumulated data. In particular, in step 355 processor 135, in conjunction with SSCH element 210, via signaling 211, determines if there is a match between the currently estimated received 15 SSCH code sequence and one of the 64 possible sequences of 15 SSCH codes that denote the scrambling code group. If there is a match, then it is assumed that SSCH element 210 has correctly identified the received sequence and frame synchronization and scrambling code group determination is completed in step 360. This match can either be an exact match across all 15 SSCH codes, or even a match to at least N, out of 15 SSCH codes if a unique scrambling code group is identifiable. N is illustratively predefined, e.g., N=13. However, if there is no match, processor 135 restarts cell search in step 305 of FIG. 4.

Once SSCH processing is successfully completed in step 320 or step 360, the scrambling code group of cell 15 is identified which enables UE 20 to descramble all of the other downlink channels of the cell (including, e.g., the Common Pilot Channel (CPICH), which is used for frequency synchronization and also to determine the actual scrambling code for the cell from the identified scrambling code group) and voice/data communications can begin.

As described above, and in accordance with the principles of the invention, the PSCH subchannel is used to monitor channel conditions during processing of the SSCH subchannel. As such, this approach may improve the performance of the SSCH processing. Although described in the context of the initial cell search process, the inventive concept is applicable to any portion of wireless operation in which a downlink channel, such as the SSCH subchannel, is processed in the presence of changing channel conditions.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs) and/or in one or more stored program-controlled processors (e.g., a microprocessor or digital signal processor (DSP)). Similarly, although illustrated in the context of a UMTS-based system, the inventive concept is applicable to any communications system that processes signals in the presence of changing channel conditions. It is therefore to be understood that numerous modifications may be made to the illustrative embodiments and that other arrangements may be devised without departing from the spirit and scope of the present invention as defined by the appended claims.

The invention claimed is:

1. A method for use in a wireless receiver, comprising:
   (a) processing a first synchronization channel of a received wireless signal to acquire a slot synchronization; and
   processing a second synchronization channel to acquire a frame synchronization while still processing the first synchronization channel to provide correlation data associated therewith; and
   if the correlation data is less than a predefined value,
     halting the processing of the second synchronization channel to acquire the frame synchronization;
     if an elapsed time for the processing of the second synchronization channel prior to being halted is less than a predefined time value, starting over with step (a); and
     if the elapsed time is greater than the predefined value, estimating a scrambling code group conveyed in the secondary synchronization channel based on data already accumulated.

2. The method of claim 1, wherein the first synchronization channel is a primary synchronization subchannel (PSCH) and the second synchronization channel is a secondary synchronization subchannel (SSCH) of a universal mobile telephone system (UMTS).

3. A method for use in a wireless receiver, the method comprising the steps of:
   processing a first synchronization channel of a received wireless signal to acquire a frame synchronization; and
   processing a second synchronization channel to provide correlation data associated therewith; and
   if the correlation data is less than predefined value, halting the processing of the first synchronization channel; and if an elapsed time for processing the first synchronization channel prior to being halted is greater than a predefined value, estimatings a scrambling code group conveyed in the first synchronization channel based on data already accumulated, otherwise, starting the processing of the first synchronization channel anew.

4. The method of claim 3, wherein the second synchronization channel is a primary synchronization subchannel (PSCH) and the first synchronization channel is a secondary synchronization subchannel (SSCH) of a universal mobile telephone system (UMTS).

5. Wireless equipment comprising:

a front end (105) for receiving a wireless signal and for providing a stream of received samples;

a primary synchronization element (205) operative on the received samples for providing data for use in acquiring a slot synchronization to a primary synchronization signal of the received wireless signal and for further processing the primary synchronization signal subsequent to the slot synchronization to continue to provide the data;

a secondary synchronization element (210) operative on the received samples for acquiring a frame synchronization to a secondary synchronization signal of the received wireless signal; and a processor (135), responsive to the provided data subsequenr to the slot synchronization from the primary synchronization element, for halting the secondary synchronization element as a function of the provided data.

6. The wireless equipment of claim 5, wherein, subsequent to the slot synchronization, the primary synchronization element continues to process the primary synchronization signal of the received wireless signal simultaneously with processing of the received wireless signal by the secondary synchronization element.

7. The wireless equipment of claim 5, wherein the provided data is representative of a correlation between a known primary synchronization code and the received primary synchronization signal, and the processor halts the secondary synchronization element if the correlation is less than a predefined value.

8. The wireless equipment of claim 5, wherein, once halted, the secondary synchronization element provides an estimate for a scrambling code group to the processor if an elapsed time for acquiring the frame synchronization prior to being halted is greater than a predefined value.

9. The wireless equipment of claim 5, wherein, once halted, the processor restarts the secondary synchronization processor if an elapsed time for acquiring the frame synchronization prior to being halted is less than a predefined value.

* * * * *